(12) United States Patent
Kim

(10) Patent No.: US 10,727,890 B2
(45) Date of Patent: Jul. 28, 2020

(54) CASE HAVING EXTENSION CONNECTOR FOR ELECTRONIC DEVICE

(71) Applicant: SPIGEN KOREA CO., LTD., Seoul (KR)

(72) Inventor: Dae-Young Kim, Seoul (KR)

(73) Assignee: Spigen Korea Co., Ltd., Seoul (KR)

( * ) Notice: Subject to any disclaimer, the term of this patent is extended or adjusted under 35 U.S.C. 154(b) by 17 days.

(21) Appl. No.: 15/591,947

(22) Filed: May 10, 2017

(65) Prior Publication Data

US 2017/0331508 A1 Nov. 16, 2017

Related U.S. Application Data

(60) Provisional application No. 62/336,542, filed on May 13, 2016.

(51) Int. Cl.
| | | |
|---|---|---|
| *H04B 1/3888* | (2015.01) | |
| *A45C 11/00* | (2006.01) | |
| *H04M 1/02* | (2006.01) | |
| *H04M 1/18* | (2006.01) | |

(52) U.S. Cl.
CPC ............ *H04B 1/3888* (2013.01); *A45C 11/00* (2013.01); *H04M 1/0274* (2013.01); *H04M 1/185* (2013.01); *A45C 2011/002* (2013.01); *A45C 2011/003* (2013.01)

(58) Field of Classification Search
CPC ..... H04B 1/3888; H04B 1/3877; A45C 11/00; A45C 13/002; A45C 2011/002; A45F 5/00; H04M 1/0202; H04M 1/0274; H04M 1/0252; H04M 1/185; G06F 3/044; G06F 3/045; H01R 13/6205; H02J 7/0044; H01H 2209/038
See application file for complete search history.

(56) References Cited

U.S. PATENT DOCUMENTS

| | | | | |
|---|---|---|---|---|
| 2006/0058073 A1* | 3/2006 | Kim | ..................... | H04B 1/3877 455/573 |
| 2011/0122090 A1* | 5/2011 | Suetomi | .................. | G06F 3/045 345/174 |
| 2011/0228458 A1* | 9/2011 | Richardson | ......... | H04M 1/0252 361/679.01 |
| 2012/0329532 A1* | 12/2012 | Ko | ........................ | H02J 7/0044 455/573 |
| 2013/0329173 A1* | 12/2013 | Jung | ..................... | H04B 1/3838 349/122 |
| 2014/0066138 A1* | 3/2014 | Kim | ..................... | H04M 1/0274 455/575.1 |
| 2015/0156291 A1* | 6/2015 | Huang | ................. | H04B 1/3888 455/575.8 |
| 2018/0028909 A1* | 2/2018 | Kim | ....................... | A45C 11/00 |

* cited by examiner

*Primary Examiner* — Jianxun Yang
(74) *Attorney, Agent, or Firm* — Heedong Chae; Lucem, PC

(57) ABSTRACT

A case for an electronic device having a plurality of wireless contact connectors includes a plurality of through-holes and a plurality extension connectors received in the through-holes. The case may include magnetic members to align and attach the extension connectors to a second device. The case may include a soft protective cover and a hard shell. The plurality of through-holes and the plurality of extension connectors may be included in an extension connector module, which is received in an aperture of the case.

16 Claims, 8 Drawing Sheets

CASE HAVING EXTENSION CONNECTOR FOR ELECTRONIC DEVICE

CROSS-REFERENCE TO RELATED APPLICATIONS

This application claims priority to U.S. provisional patent application No. 62/336,542, filed on May 13, 2016, the contents of which are incorporated herein by reference.

FIELD OF THE INVENTION

The present invention relates to a case having extension connectors corresponding to connector ports of an electronic device, and more particularly, to a case having extension connectors to be connected to wireless contact connectors of a smart phone.

BACKGROUND OF THE INVENTION

Apple, Inc. of Cupertino, Calif. has introduced Smart Connector (trademark) for connecting a tablet computer device such as iPad Pro (trademark) to an accessory device such as a keyboard; the details thereof were disclosed in U.S. Pat. No. 9,335,793 (the '793 patent), the contents of which are incorporated herein by reference. Apple's smartphone, iPhone (trademark), or other smart phones may have such connectors as well. As disclosed in the '793 patent, there may be a plurality of separate connectors.

The Smart Connector is capable of transmitting both data and power and allows for a wireless contact connection between two devices. For instance, iPad Pro uses the Smart Connector for convenient connection between iPad Pro and a keyboard.

This kind of connectors eliminates the need for a wireless data transmitter and makes the connection between two devices quite simple. Such contact data connection removes security concerns associated with wireless data connection.

In addition to the Smart Connector, magnetic attraction may be used to magnetically align and attach two devices for data and power connection between the two devices through the Smart Connector. Such magnetic attraction is disclosed in U.S. Pat. No. 9,326,576 (the '576 patent), the contents of which are incorporated herein by reference. FIG. 10B of the '574 patent describes magnet array for both devices.

Electronic devices such as smart phones have become ubiquitous and users rely on these devices for communication, social media, and more. Such devices may store personal data, pictures, or videos that may be difficult to replace; furthermore, such devices may be expensive. Therefore, many consumers desire protective cases to prevent damage to the electronic devices. However, such cases may inhibit functions of the electronic devices. A user may have to balance safekeeping of an electronic device with its functionality.

SUMMARY OF THE INVENTION

The present invention is directed to a case having extension connectors for an electronic device which has Smart Connector or similar wireless contact data and power connectors. Each of the extension connectors of the case are constructed to be connected to each data and power connector so that the electronic device, such as a smart phone, may be connected to a second device through the data and power connectors. The second device may be a keyboard, speaker, charger, and so forth and instead of a smart phone, the case of the present invention may be constructed to fit other devices such as tablet computing device, hand-held electronic device, PDA or the like.

The case may be provided with a plurality of through-holes to receive a plurality of corresponding extension connectors. Such a case may be formed to substantially cover a back and sides of an electronic device having wireless contact data and power connectors. The case may include a soft protective cover to substantially The advantages of the present invention are: (1) wireless contact connectors of a smart phone can be connected to another device even if the smart phone is received in a case; (2) the case has a magnetic structure so that the case can be magnetically aligned and attached to a second device; and (3) the structure and materials used for the case ensure sufficient electrical contacts between the extension connectors and the connectors of the electronic device are maintained.

Although the present invention is briefly summarized, a fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
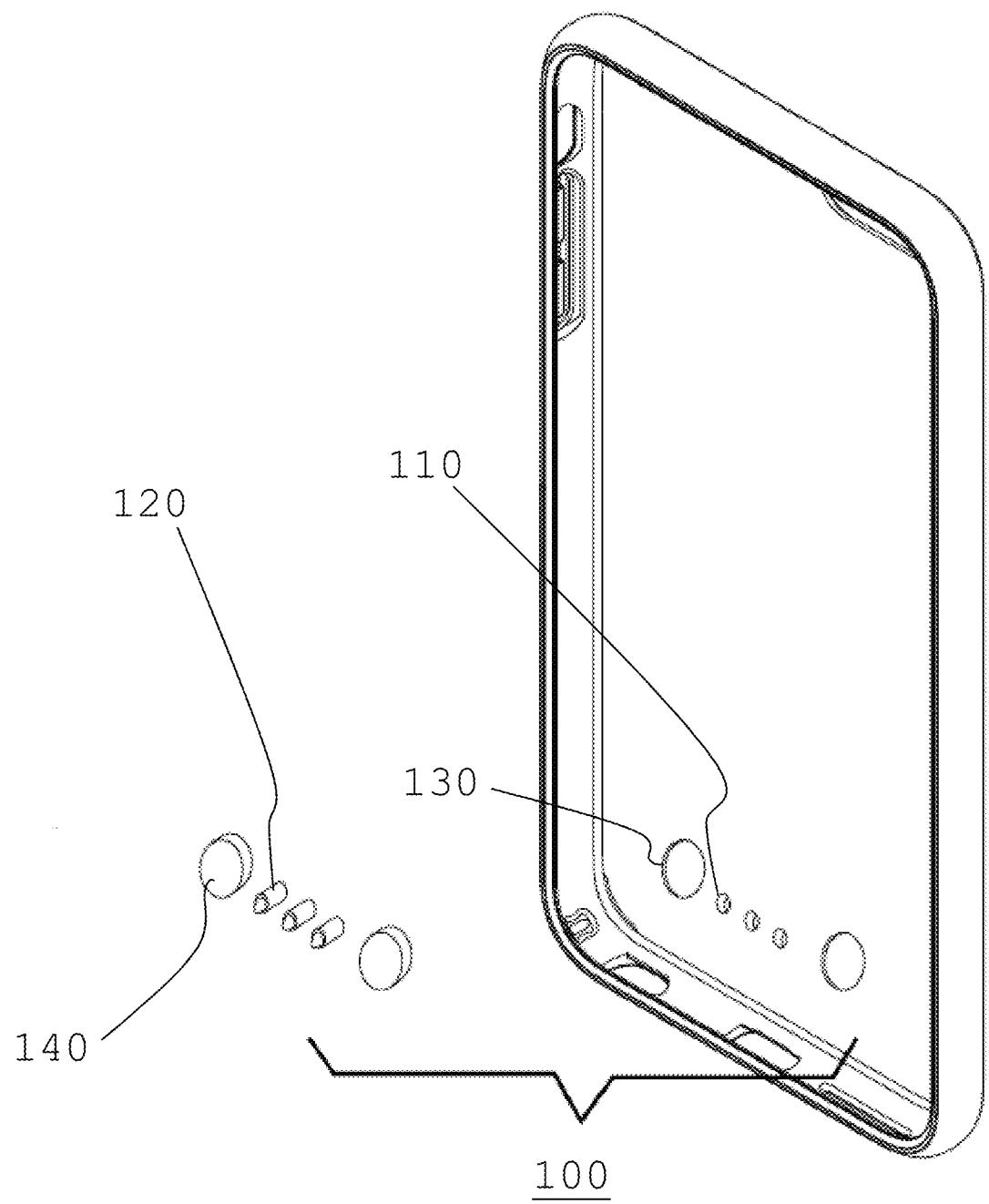
FIG. 1 shows an exploded front perspective view of one embodiment of the present invention.
Figure 2:
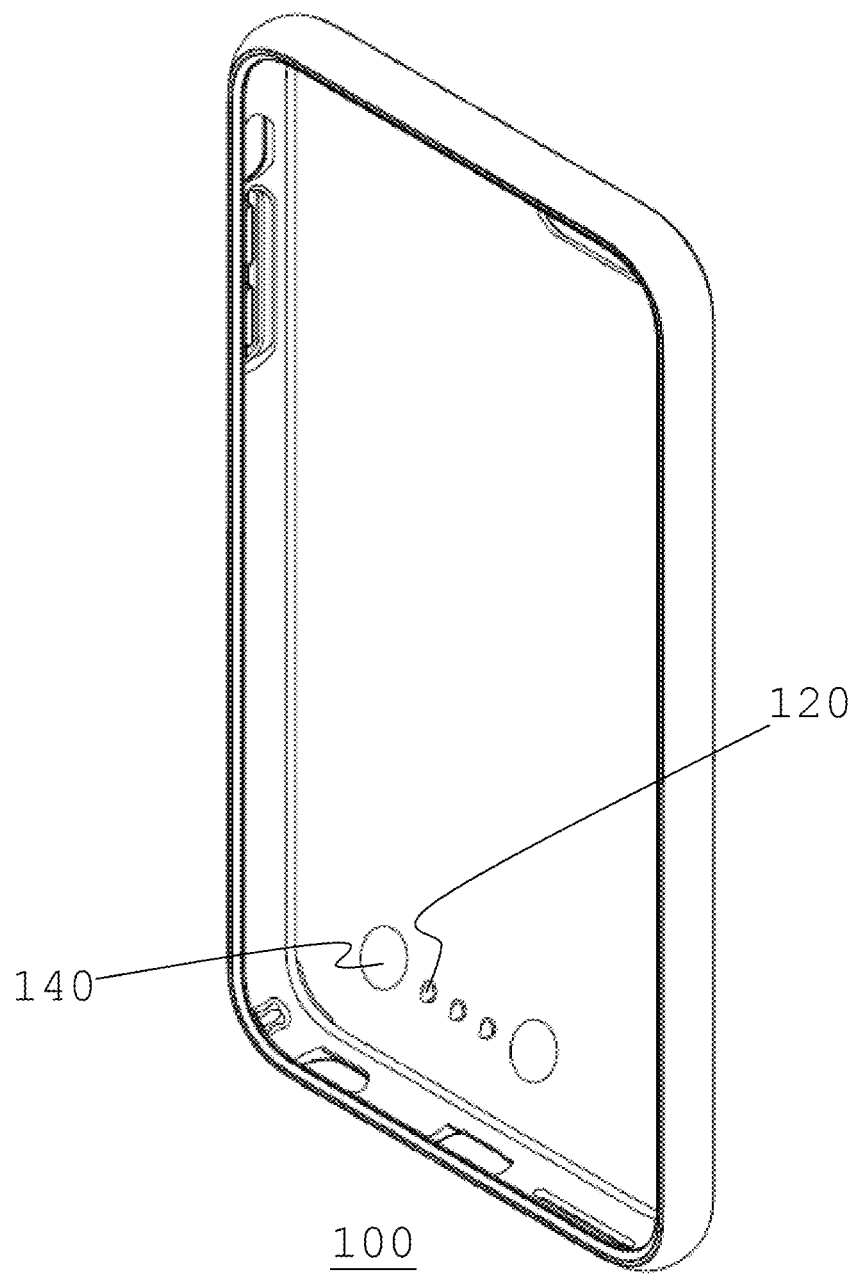
FIG. 2 shows an assembled view thereof.

Reference will now be made in detail to the preferred embodiments of the present invention, examples of which are illustrated, in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

The present invention provides a case 100 for an electronic device 10 having a plurality of connectors 11. The connectors 11 of the electronic device 10 may be wireless contact connectors. Such connectors 11 may be used to transmit data, power, or both data and power between the electronic device 10 and a second device (not shown). Herein, data may be any media capable of being stored on the electronic device. Power may be provided to the electronic device 10; alternatively, the electronic device 10 may power the second device.

FIGS. 1-4 illustrate one embodiment of the case 100 of the present invention, which includes: a plurality of through-holes 110 formed to correspond to the quantity and positions of the plurality of connectors 11 of the electronic device 10; and a plurality of extension connectors 120 corresponding to and respectively received in the plurality of through-holes 110. The extension connectors 120 may facilitate transmission of data, power, or both between the connectors of the electronic device 10 and the second device (not shown).

The plurality of extension connectors 120 may be fixedly attached to the plurality of through-holes 110. The case 100 may exert tensional force when the electronic device 10 is received therein and the extension connectors 120 contact the connectors 11 of the electronic device 10. A connecting interface between the electronic device 10 and the case 100 is shown schematically in the cross-sectional view of FIG. 4.

The extension connectors 120 may be made of a conductive material such as a metal.

The case 100 may further include a plurality of magnetic members 140 disposed near the plurality of the through-holes 110. The magnetic members 140 may be magnets. Alternatively, the magnetic members 140 may be made of a ferromagnetic material such as steel.

The plurality of magnetic members 140 may be arranged symmetrically with respect to the plurality of through-holes 110. The quantity of magnetic members 140 may be two; the magnetic members 140 may be arranged on both outer sides of the plurality of through-holes 110. The magnetic members 140 magnetically align and attach the extension connectors 120 to connectors of another device for data and power connection. Such magnetic connection may additionally help proper and secure connection of the case 100 to a dock or charging station or the like.

The case 100 may further include a plurality of recesses 130, as shown in FIG. 1. Each recess 130 may receive one of the magnetic members 140. Each magnetic member 140 may be fixedly attached to the respective recess 130.

The plurality of recesses 130 may be formed on a side of the case 100 facing the electronic device 10.

The case 100 may be made of a soft material. Preferably, the soft material may be a thermoplastic polyurethane (TPU), but another soft material may be used.

Alternatively, the case 100 may be made of a hard material. Preferably, the hard material may be a polycarbonate, but another hard material may be used.

Figure 3:
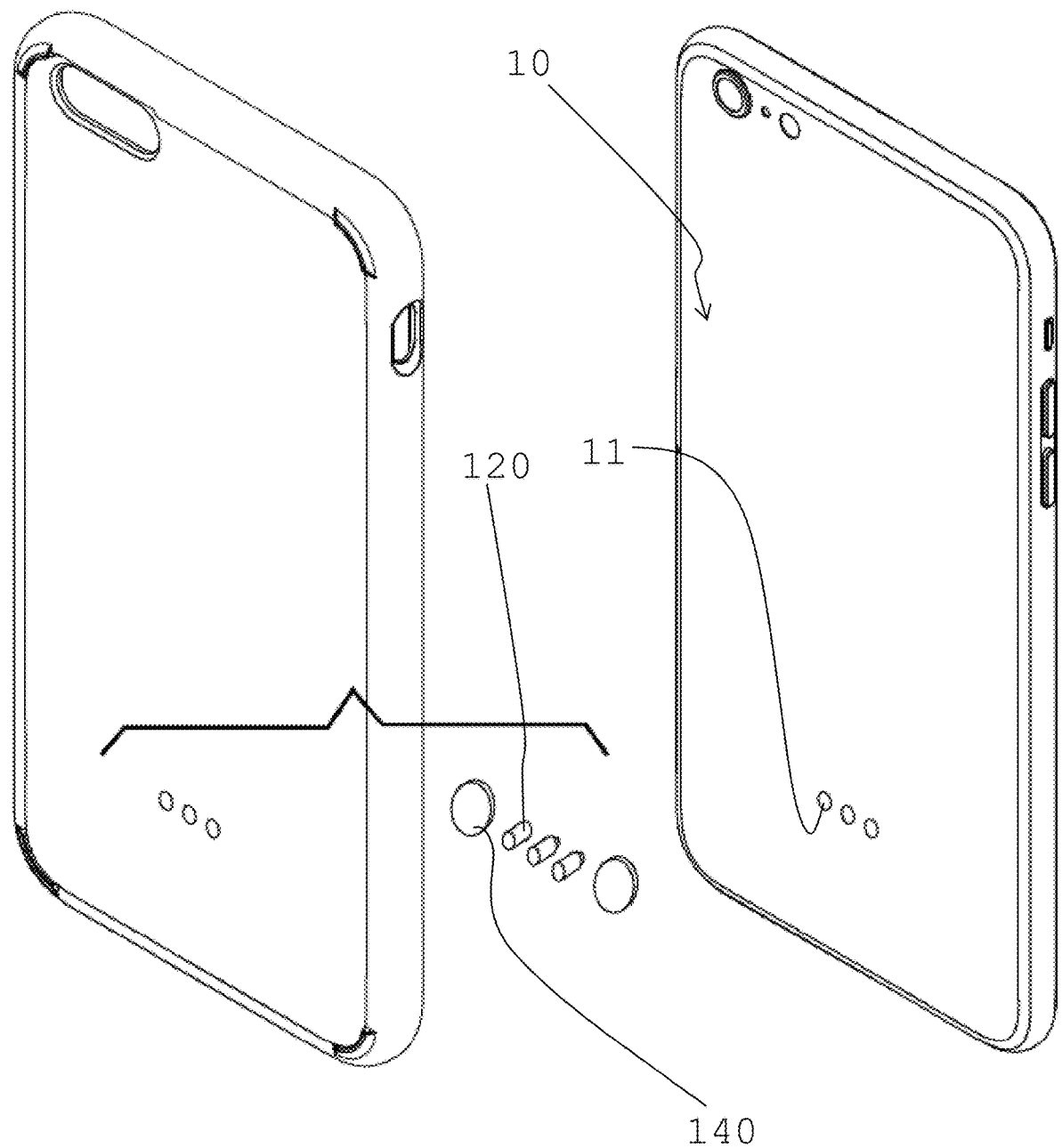
FIG. 3 shows an exploded rear perspective view of the embodiment of the present invention along with a smart phone having wireless contact connectors.

FIG. 3 shows an exploded view of the case 100 and the electronic device 10. The electronic device 10 may be a smart phone having wireless contact data and power connectors 11. Alternatively, the electronic device 10 may be a tablet computer, a mobile phone, or a personal digital assistant (PDA).

Figure 4:
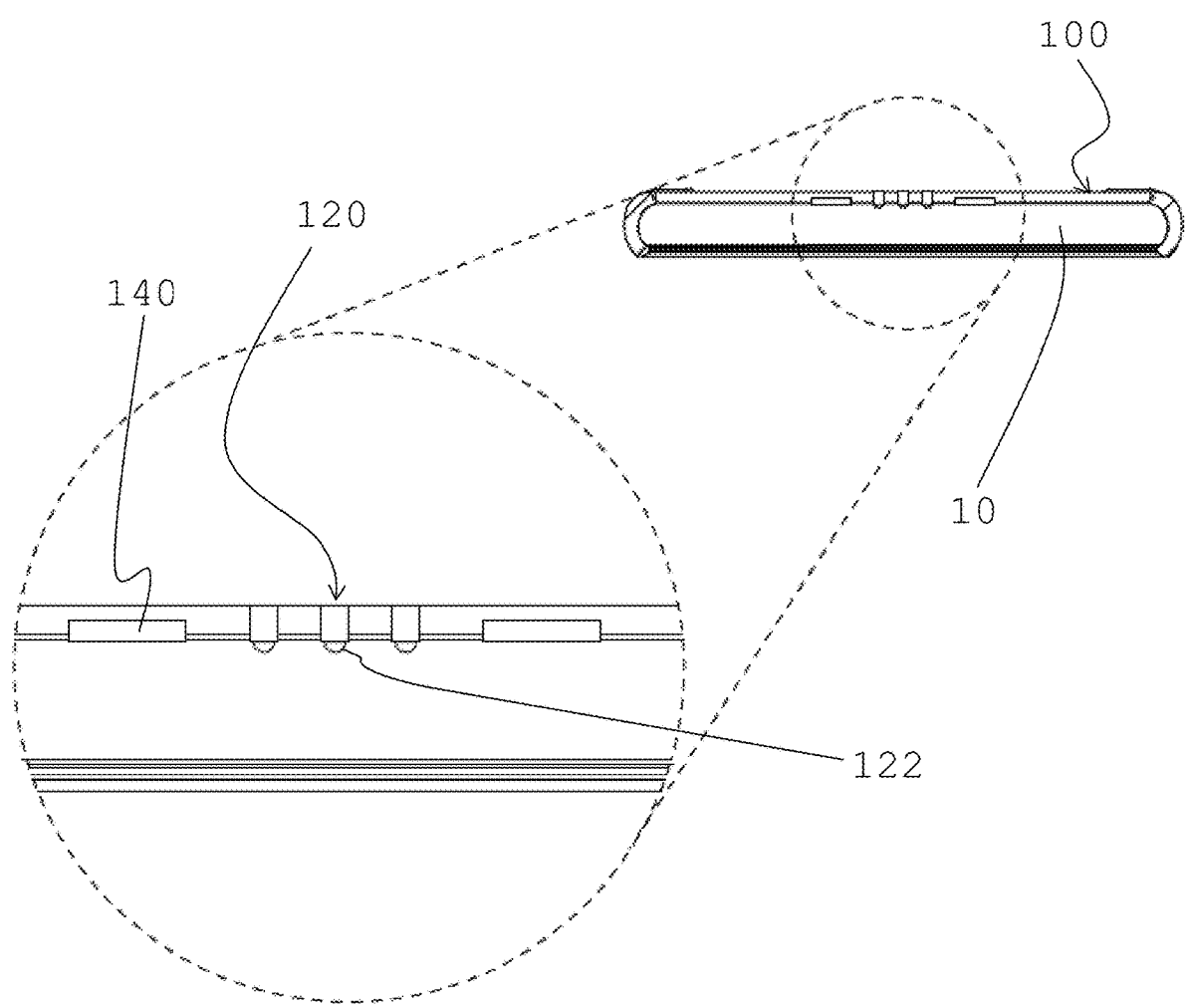
FIG. 4 shows a cross-sectional view of the present invention.

As shown in FIG. 4, the plurality of extension connectors 120 may be slightly protruded toward the connectors 11 of the electronic device 10. The plurality of extension connectors 120 may be provided with a resilient member 122 to resiliently bias the extension connectors 120 against the connectors 11 of the electronic device 10 by exerting pressure when the extension connectors 120 contact the connectors 11 of the electronic device 10.

The resilient member 122 may include a spring. The extension connector 120 having the resilient member 122 may have a structure and function similar to a pogo pin.

Figure 5:
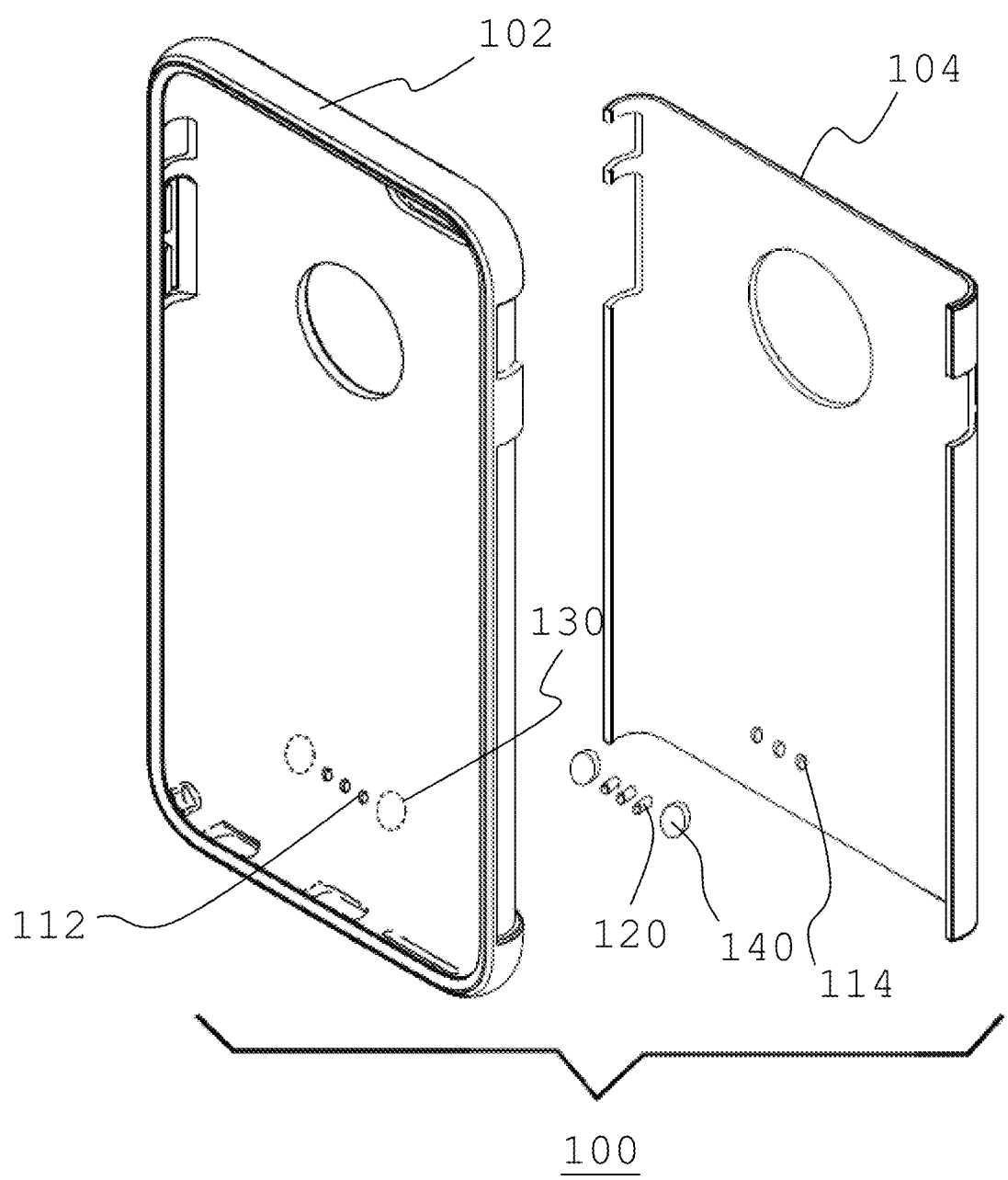
FIG. 5 an exploded front perspective view of another embodiment of the present invention.
Figure 6:
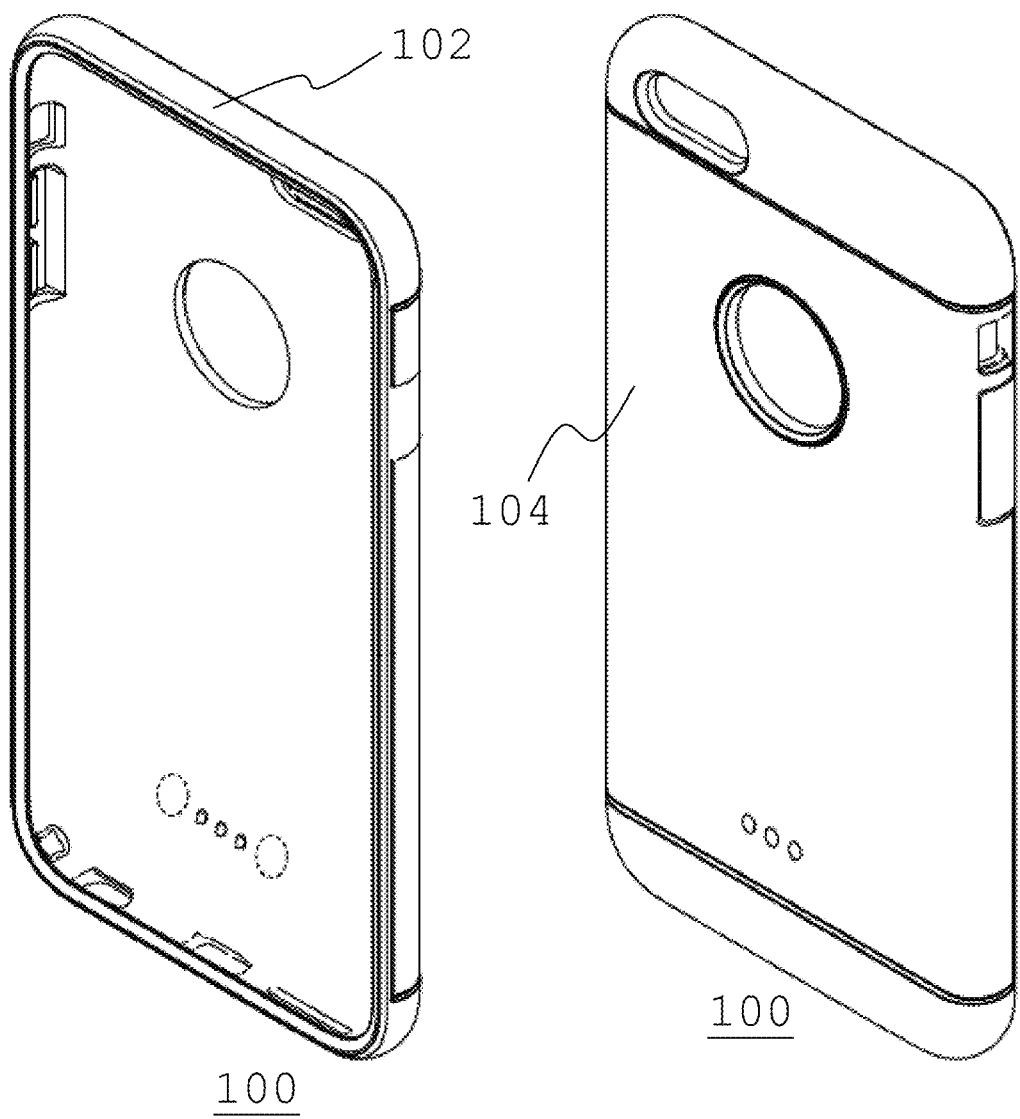
FIG. 6 shows front and rear perspective views thereof.

FIGS. 5 and 6 illustrate another embodiment of the present invention, which provides a case 100 for an electronic device 10 having a plurality of connectors 11. The case 100 may include: a soft protective cover 102, which significantly covers side and back portions of the electronic device 10; a hard shell 104 constructed to removably mount over the soft protective cover 102; a plurality of first through-holes 112 formed in the soft protective cover 102 to correspond to the quantity and positions of the plurality of connectors 11 of the electronic device 10; a plurality of second through-holes 114 formed in the hard shell 104 to correspond to the quantity and positions of the plurality of connectors 11 of the electronic device 10; and a plurality of extension connectors 120 corresponding to and respectively received in the pluralities of first 112 and second 114 through-holes.

The plurality of extension connectors 120 may be fixedly attached to the first through-holes 112 of the soft protective cover 102. Alternatively, the plurality of extension connectors 120 may be fixedly attached, to the second through-holes 114 of the hard shell 104. The case 100 may exert tensional force when the electronic device 10 is received therein and the extension connectors 120 contact the connectors 11 of the electronic device 10.

The electronic device 10 may be a smart phone having wireless contact data and power connectors 11. Alternatively, the electronic device 10 may be a tablet computer, a mobile phone, or a personal digital assistant (PDA).

The extension connectors 120 may be made of a conductive material such as a metal.

The case 100 may further include a plurality of magnetic members 140 disposed near the plurality of extension connectors 120. The magnetic members 140 may be magnets. Alternatively, the magnetic members 140 may be made of a ferromagnetic material such as steel.

The plurality of magnetic members 140 may be arranged symmetrically with respect to the plurality of extension connectors 120. The quantity of magnetic members 140 may be two; the magnetic members 140 may be arranged on both outer sides of the extension connectors 120 as shown in FIG. 5.

The case 100 may further include a plurality of recesses 130, as shown in FIGS. 5 and 6, wherein dashed lines denote that the recesses 130 are formed on an opposite side. Each recess 130 may receive one of the magnetic members 140. Each magnetic member 140 may be fixedly attached to the respective recess 130.

The plurality of recesses 130 may be a plurality of openings to respectively receive the plurality of magnetic members 140.

As shown in FIG. 5, the recesses 130 may be formed on a side of the soft protective cover 102 facing the hard shell 104. Alternatively, the recesses 130 may be formed on an opposite side of the soft protective cover 102 or a side of the hard shell 104 facing the soft protective cover 102 or both of the soft protective cover 102 and the hard shell 104.

Preferably, the soft protective cover 102 may be made of a thermoplastic polyurethane (TPU), but another soft material may be used. Such soft material can exert tensional force against the connectors 11 of the electronic device 10 when the extension connectors 120 contact the connectors 11 of the electronic device 10.

Preferably, the hard shell 104 may be made a polycarbonate, but another hard material may be used.

The plurality of extension connectors 120 may be slightly protruded toward the connectors 11 of the electronic device 10. The plurality of extension connectors 120 may be provided with a resilient member 122 to resiliently bias the extension connectors 120 against the connectors 11 of the electronic device 10 by exerting pressure when the extension connectors 120 contact the connectors 11 of the electronic device 10.

The resilient member 122 may include a spring. The extension connector 120 having the resilient member 122 may have a structure and function similar to a pogo pin.

Figure 7:
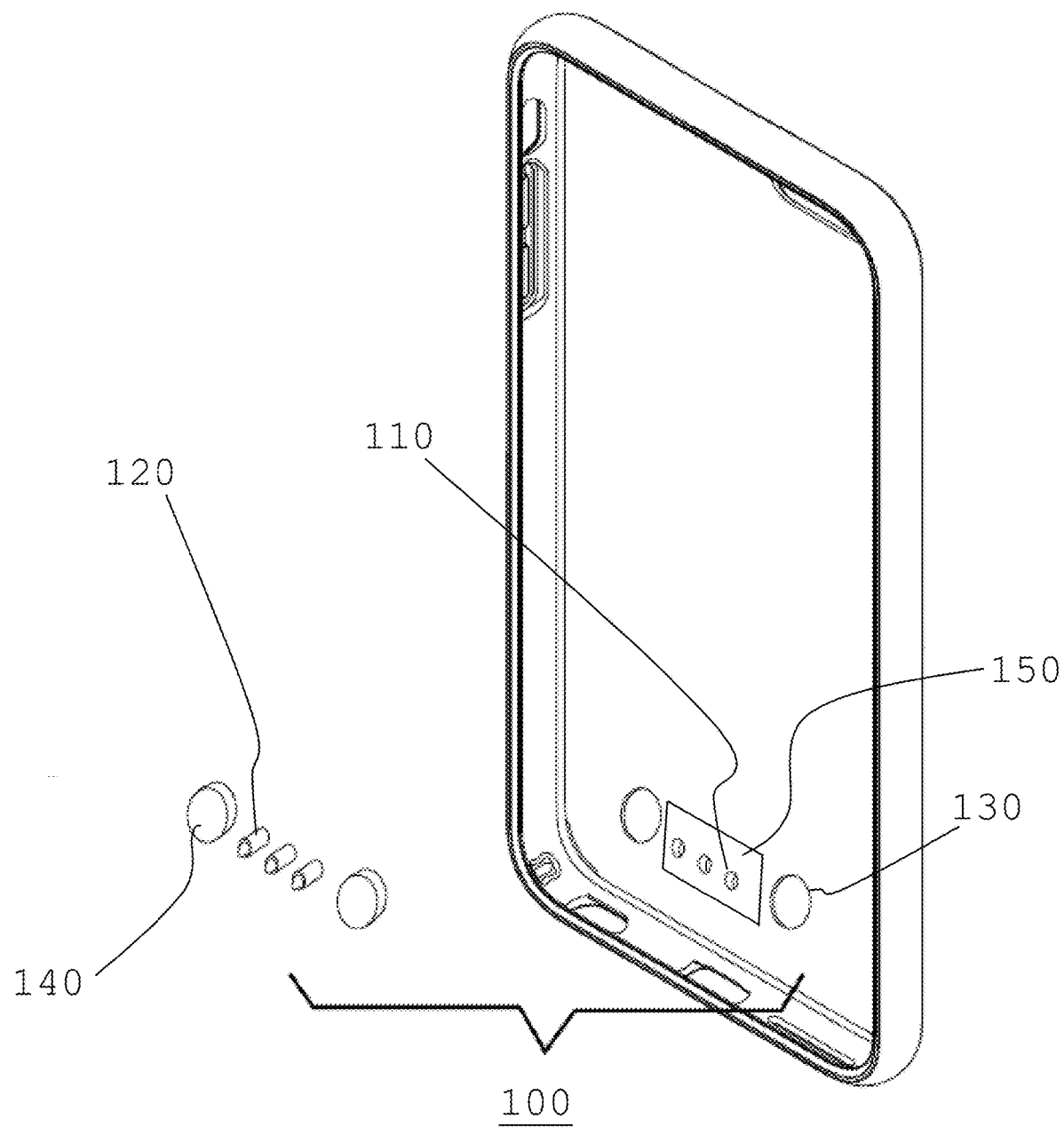
FIG. 7 shows an exploded front perspective view of yet another embodiment of the present invention.
Figure 8:
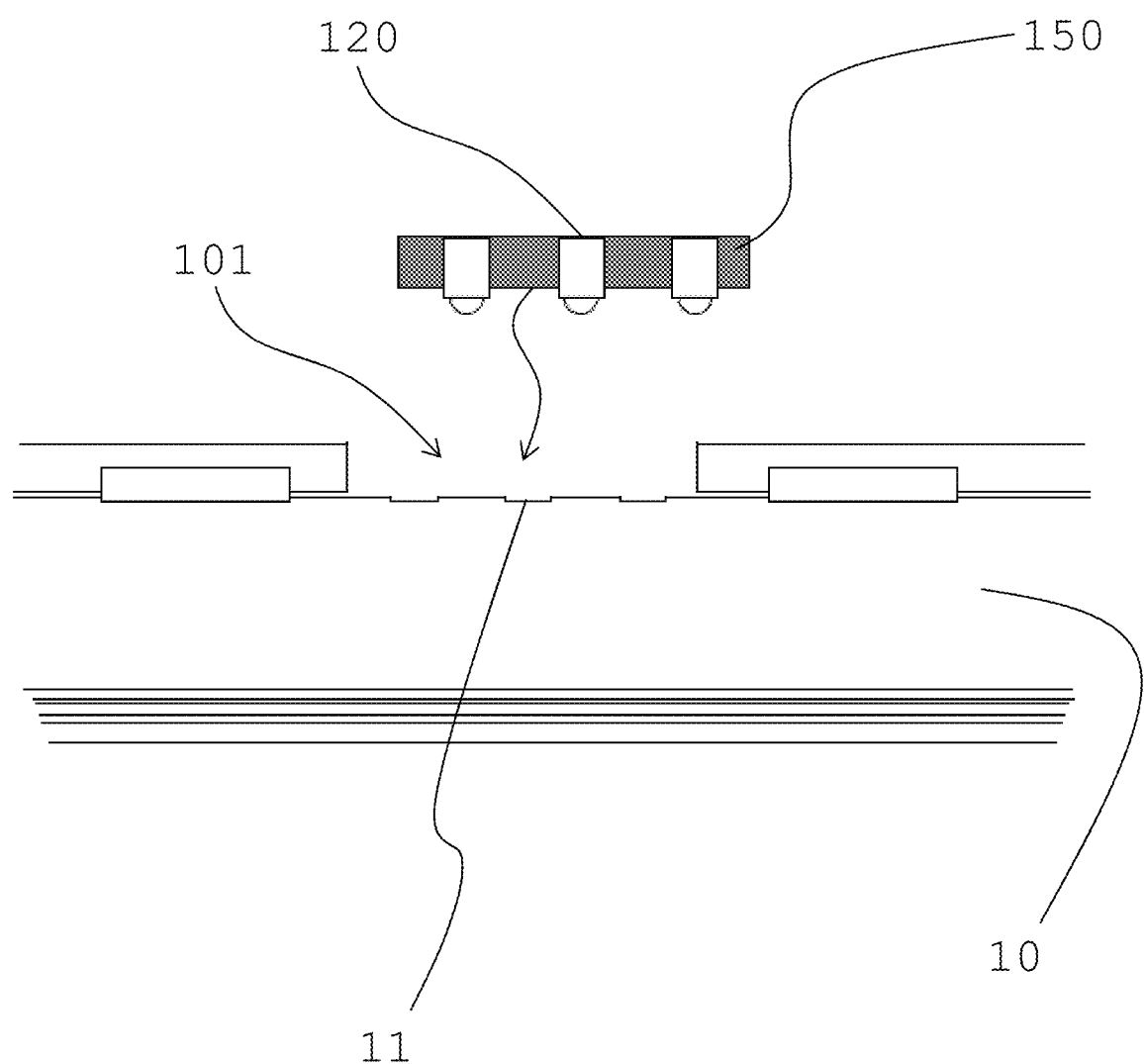
FIG. 8 shows a partially exploded cross-sectional view thereof.

A third embodiment of the present invention may provide a case 100 having an aperture 101 formed on the case 100, as illustrated in FIGS. 7 and 8. The case 100 may include: an extension connector module 150 constructed to be received in the aperture 101, wherein the extension connector module 150 comprises a plurality of through-holes 110 formed to correspond to the quantity and positions of a plurality of connectors 11 of an electronic device 10 received in the case 100; and a plurality of extension connectors 120 corresponding to and respectively received in the plurality of through-holes 110. The base of the extension connector module ISO where the through-holes 110 are formed may be made of TPU or a hard material such as polycarbonate or both of TPU and polycarbonate. If it is made of TPU and the extension connectors 120 are slightly protruded, the base can exerts tensional force when the extension connectors 120 contact the connectors 11. Alternatively, the extension connectors 120 may have a resilient member such as a spring. In one embodiment, the base of the extension connector module 150 may be made of TPU and the boundary of the base is made of hard material such as polycarbonate.

The case 100 may include a coupling structure to couple the extension connector module 150 and the aperture 101. The extension connector module 150 may be detachably or fixedly received in the aperture 101.

FIG. 8 is a schematic illustration of the extension connector module 150 being received in the aperture 101 of the case. The extension connector module 150 may fit by a frictional fit in the aperture 101.

The plurality of extension connectors 120 may be fixedly attached to the extension connector module 101 in the through-holes 110 and the case 100 may exert tensional force when the electronic device 10 is received therein and the extension connectors 120 contact the connectors 11 of the electronic device 10.

The electronic device 10 may be a smart phone having wireless contact data and power connectors 11. Alternatively, the electronic device 10 may be a tablet computer, a mobile phone, or a personal digital assistant (PDA).

The extension connectors 120 may be made of a conductive material such as a metal.

The case 100 may further include a plurality of magnetic members near 140 the plurality of the through-holes 110. The magnetic members 140 may be magnets. Alternatively, the magnetic members 140 may be made of a ferromagnetic material such as steel.

The plurality of magnetic members 140 may be arranged symmetrically with respect to the extension connector module 150, as shown in FIG. 7. The quantity of magnetic members 140 may be two; the magnetic members 140 may be arranged on both outer sides of the extension connector module 150.

The case 100 may further include a plurality of recesses 130 to respectively receive the plurality of the magnetic members 140. The magnetic members 140 may be fixedly attached to the recesses 130.

The recesses 140 may be formed on a side of the case 100 which faces the electronic device 10.

The case 100 may be made of a soft material such as TPU. Alternatively, the case 100 may be made of a hard material such as polycarbonate or a combination of TPU and polycarbonate. For example, the case 100 may have a polycarbonate back and TPU sides. In any of these embodiments, the extension connector module 150 may be made of a soft material such as TPU or a hard material such as polycarbonate.

The plurality of the extension connectors 120 may be slightly protruded toward the connectors 11 of the electronic device 10. The plurality of the extension connectors 120 may be provided with a resilient member 122 to resiliently bias the extension connectors 120 against the connectors 11 of the electronic device 10 by exerting pressure when the extension connectors 120 contact the connectors 11 of the electronic device 10.

The resilient member 122 may include a spring. The extension connector 120 having the resilient member 122 may have a structure and function similar to a pogo pin.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case for an electronic device having a plurality of connectors, wherein the electronic device further includes a back cover and wherein the plurality of connectors are accessible through the back cover of the electronic device, the case comprising:
   a plurality of through-holes formed through the case to correspond to the quantity and positions of the plurality of connectors of the electronic device;
   a plurality of extension connectors corresponding to and respectively received in the plurality of through-holes;
   a plurality of magnetic members near the plurality of through-holes; and
   a plurality of recesses to respectively receive the plurality of magnetic members,
   wherein the plurality of extension connectors are fixedly attached to the through-holes and the case exerts tensional force when the extension connectors directly contact the connectors of the electronic device,
   wherein the plurality of extension connectors are arranged substantially along a first line,
   wherein the plurality of extension connectors are disposed substantially between the plurality of magnetic members,
   wherein the plurality of magnetic members are disposed substantially symmetrical about a second line wherein the second line is orthogonal to the first line,
   wherein the case significantly covers the back cover of the electronic device.

2. The case of claim 1, wherein the case is made of soft material.

3. The case of claim 1, wherein the case is made of hard material.

4. The case of claim 1, wherein the plurality of the extension connectors are slightly protruded toward the connectors of the electronic device, and wherein the plurality of the extension connectors are provided with a resilient member to resiliently bias the extension connectors against the connectors of the electronic device by exerting pressure when the extension connectors contact the connectors of the electronic device.

5. The case of claim 4, wherein the resilient member comprises a spring.

6. The case of claim 1, wherein the plurality of recesses are formed on an inner face of the case.

7. A case for an electronic device having a plurality of connectors, the case comprising:
- a soft protective cover, which significantly covers side and back portions of the electronic device;
- a hard shell constructed to removably mount over the soft protective cover;
- a plurality of first through-holes formed in the soft protective cover to correspond to the quantity and positions of the plurality of connectors of the electronic device;
- a plurality of second through-holes formed in the hard shell to correspond to the quantity and positions of the plurality of connectors of the electronic device;
- a plurality of extension connectors corresponding to and respectively received in the plurality of first and second through-holes;
- a plurality of magnetic members near the plurality of through-holes; and
- a plurality of recesses to respectively receive the plurality of magnetic members,
- wherein the plurality of extension connectors are fixedly attached either to the first through-holes of the soft protective cover or to the second through-holes of the hard shell and the case exerts tensional force when the extension connectors contact the connectors of the electronic device.

8. The case of claim 7, wherein the plurality of the extension connectors are slightly protruded toward the connectors of the electronic device, and wherein the plurality of the extension connectors are provided with a resilient member to resiliently bias the extension connectors against the connectors of the electronic device by exerting pressure when the extension connectors contact the connectors of the electronic device.

9. The case of claim 8, wherein the resilient member comprises a spring.

10. The case of claim 7, wherein the plurality of recesses are formed on a side of the soft protective cover facing the hard shell or formed on an opposite side of the soft protective cover that is opposite to the side of the soft protective cover.

11. The case of claim 7, wherein the plurality of recesses are formed on a side of the hard shell facing the soft protective cover.

12. The case of claim 7, wherein the plurality of recesses are formed on both of the soft protective cover and the hard shell.

13. A case for an electronic device having a plurality of connectors, comprising:
- an aperture formed through the case;
- an extension connector module constructed to be received in the aperture, wherein the extension connector module comprises a plurality of through-holes formed through the extension connector module to correspond to the quantity and positions of the plurality of connectors of the electronic device;
- a plurality of extension connectors corresponding to and respectively received in the plurality of through-holes;
- a plurality of magnetic members near the plurality of through-holes; and
- a plurality of recesses to respectively receive the plurality of magnetic members,
- wherein the plurality of extension connectors are fixedly attached to the extension connector module of the case in the through-holes and the case exerts tensional force when the extension connectors directly contact the connectors of the electronic device,
- wherein the plurality of extension connectors are arranged substantially along a first line,
- wherein, when the extension connector module is received in the aperture, the plurality of extension connectors are disposed substantially between the plurality of magnetic members, and
- wherein, when the extension connector module is received in the aperture, the plurality of magnetic members are disposed substantially symmetrical about a second line wherein the second line is orthogonal to the first line.

14. The case of claim 13, wherein the plurality of the extension connectors are slightly protruded toward the connectors of the electronic device, and wherein the plurality of the extension connectors are provided with a resilient member to resiliently bias the extension connectors against the connectors of the electronic device by exerting pressure when the extension connectors contact the connectors of the electronic device.

15. The case of claim 14, wherein the resilient member comprises a spring.

16. The case of claim 13, wherein the plurality of recesses is formed on an inner surface of the case.

* * * * *